(12) United States Patent
Gilleeney et al.

(10) Patent No.: US 11,430,061 B2
(45) Date of Patent: Aug. 30, 2022

(54) DYNAMIC MULTI-PARTY MESSAGE REPORTING SYSTEM

(71) Applicant: S&P Global, Houston, TX (US)

(72) Inventors: Mark Gilleeney, London (GB); Eric Gerald Janssen, Houston, TX (US); Mark Anthony Callahan, Houston, TX (US); Ryan Kevin Ouwerkerk, Houston, TX (US); Samer Joseph Mosis, Houston, TX (US)

(73) Assignee: S&P Global, Houston, TX (US)

( * ) Notice: Subject to any disclaimer, the term of this patent is extended or adjusted under 35 U.S.C. 154(b) by 2 days.

(21) Appl. No.: 17/032,735

(22) Filed: Sep. 25, 2020

(65) Prior Publication Data
US 2021/0090170 A1    Mar. 25, 2021

Related U.S. Application Data

(60) Provisional application No. 62/905,750, filed on Sep. 25, 2019.

(51) Int. Cl.
*G06Q 40/04* (2012.01)
*H04L 9/06* (2006.01)

(52) U.S. Cl.
CPC .......... *G06Q 40/04* (2013.01); *H04L 9/0643* (2013.01); *G06Q 2220/00* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 7,617,111 B1* | 11/2009 | Sheppard | ............... | G06Q 10/06 705/1.1 |
| 8,538,795 B2* | 9/2013 | Fell | ........... | G06Q 50/06 705/7.35 |
| 2007/0061174 A1* | 3/2007 | Phillips | ................. | G06Q 10/02 705/5 |
| 2020/0143471 A1* | 5/2020 | Jackson | ................. | G06Q 40/04 |
| 2020/0219089 A1* | 7/2020 | Crumb | ................... | G06Q 40/04 |

OTHER PUBLICATIONS

Nakamoto, Satoshi: "Bitcoin: A Peer-to-Peer Electronic Cash System", 9 pages.

* cited by examiner

*Primary Examiner* — Christopher Bridges
(74) *Attorney, Agent, or Firm* — Perkins Coie LLP

(57) ABSTRACT

A system is provided for securely tracking submissions of commodity trades for commodities. The system receives from a price reporter a report on commodity trades between the price reporter and another entity. Each commodity trade includes pricing information and a location of delivery of the commodity. The system generates a hash of the report as evidence of the commodity trades of the report. For each commodity trade of the report, the system maps the location of that commodity trade to an assessment of pricing information such that the commodity trade is to be included in the assessment. The system provides to the price reporter the hash of the report as evidence of the commodity trades. The system provides to the price reporter a listing of the commodity trades of the report for each commodity trade. The listing identifies each assessment that includes that commodity trade.

28 Claims, 7 Drawing Sheets

400

| | Trade Mapping | | | | | | ✕ |
|---|---|---|---|---|---|---|---|
| | 2019-07-01 Report | | | | | | |
| | S.F. | E.F. | B/S | Location | Indices | Qty | Price |
| 401 | 2019-07-02 | 2019-07-03 | S | L1/P2 | I3/I5 | 10 | 2.14 |
| 402 | 2019-07-02 | 2019-07-04 | B | L1/P2 | I3/I5 | 5 | 2.145 |
| 403 | 2019-07-02 | 2019-07-05 | S | L2/P1 | I4 | 13.5 | 2.145 |
| 404 | 2019-07-02 | 2019-07-05 | B | L3/P3 | I7 | 10 | 2.15 |

Upload Trades                                                100

Date 101
2019-07-01 ▼

Report Name 102
2019-07-01.csv ▼

103
- ☐ Verify
- ☐ Upload
- ☐ Forward
- ☐ Generate hash

104
Submit

*FIG. 1*

Alert Log                                                    200

| | Alert Time | | Alert Type | Alert Info |
|---|---|---|---|---|
| 201 | 2019-07-01 | 12:45 ET | Uploaded | 2019-07-01.csv |
| 202 | 2019-07-01 | 12:40 ET | Upload Alert | 13:00 ET |
| 203 | 2019-07-01 | 12:30 ET | Upload Alert | 13:00 ET |
| | ⋮ | ⋮ | ⋮ | ⋮ |
| 204 | 2019-06-28 | 14:05 ET | Corrections Uploaded | 2019-06-28(c).csv |
| 205 | 2019-06-28 | 13:20 ET | Correction Request | 2019-06-28.csv |
| 206 | 2019-06-28 | 12:50 ET | Upload | 2019-06-28.csv |

*FIG. 2*

|     | Trade Upload History | | | | | |
|-----|------|--------|----------------|---------|----------|
|     | Date | Trades | Report Name | Hash | Status |
| 301 | 2019-07-01 | 41,000 | 2019-07-01(c).csv | B910AF... | corrected |
| 302 | 2019-06-28 | 45,000 | 2019-06-28.csv | C186C1... | verified |
| 303 | 2019-06-27 | 70,000 | 2019-06-27.csv | ⋮ | ⋮ |
| 304 | 2019-06-26 | 62,000 | 2019-06-26.csv | ⋮ | ⋮ |
| 305 | 2019-06-25 | 52,000 | 2019-06-25.csv | | |
| 306 | 2019-06-24 | 61,000 | 2019-06-24.csv | | |

*FIG. 3*

|     | Trade Mapping | | | | | | |
|-----|------|------|-----|----------|---------|------|-------|
|     | 2019-07-01 Report | | | | | | |
|     | S.F. | E.F. | B/S | Location | Indices | Qty | Price |
| 401 | 2019-07-02 | 2019-07-03 | S | L1/P2 | I3/I5 | 10 | 2.14 |
| 402 | 2019-07-02 | 2019-07-04 | B | L1/P2 | I3/I5 | 5 | 2.145 |
| 403 | 2019-07-02 | 2019-07-05 | S | L2/P1 | I4 | 13.5 | 2.145 |
| 404 | 2019-07-02 | 2019-07-05 | B | L3/P3 | I7 | 10 | 2.15 |

*FIG. 4*

DYNAMIC MULTI-PARTY MESSAGE REPORTING SYSTEM

CROSS-REFERENCE TO RELATED APPLICATION

This application claims the benefit of U.S. Provisional Patent Application No. 62/905,750 filed on Sep. 25, 2019, which is hereby incorporated by reference in its entirety.

BACKGROUND INFORMATION

1. Field

The present disclosure relates generally to an electronic messaging system and, in particular, to a dynamic multi-party message reporting system.

2. Background

Price reporting agencies ("PRAs") produce pricing indicators that include assessments for commodities that are representative of market value based on commodity transactions that includes trades, bids, and offers involving the commodities. An assessment, for example, may represent an average price for a commodity. A PRA may provide assessments for various types of commodities (e.g., natural gas, petroleum, and electricity) covering different locations (e.g., a location on a pipeline, a city, and a region). The trades are between a buyer and a seller for delivery of an amount of the commodity to a location during a time period for a price. A PRA generates an assessment covering trades at one or more locations during a time period (e.g., daily and monthly). An assessment may represent an estimate of what pricing (e.g., average price) at a location would have been when, for example, the number of trades (if any) or the number of reported trades associated with that location is small. An assessment for a location may be based on bid and offers associated with that location that did not result in a trade, trades at another location or group of locations deemed to be similar to that location, trades at that locations (although their number is insufficient to support an assessment), and so on. Locations may be deemed to be similar, for example, if they represent points on the same pipeline that are in geographic proximity, locations within similar commodity markets, and so on.

A PRA may rely on buyers and sellers to submit commodity information describing their trades and bids and offers. Such buyers and sellers are referred to as price reporters ("PRs"). Governmental guidelines (e.g., those published by the U.S. Federal Energy Regulatory Commission) may describe what trades should be reported, and what information about the trades should be reported, and when the trades should be reported, to a PRA. For example, the guidelines may state that PRs should report each bilateral, arm's-length trade between non-affiliated entities (buyers and sellers) in the physical markets at all trading locations.

A primary purpose of the assessments is to assist buyers and sellers in negotiating trades. Moreover, the price of some future trades may be tied directly to an assessment published on a certain day. So, the accuracy of the trade information included in an assessment is important and should be available to all buyers and sellers (and others of interest). Although buyers and sellers would like access to relevant assessments, they would like to keep the details of their individual trades submitted to a PRA confidential because knowledge of the details may give other entities a competitive advantage.

To make the assessments particularly useful, a PR would like to understand the locations of commodity trades that are included in each assessment. To assist the PRs, a PRA may publish specifications describing what commodity trades are included in each assessment. These specifications, however, can be quite complex and difficult to understand. An example of such a specification for an assessment referred to as "NGPL, Texok zone" is:

> Deliveries to Natural Gas Pipeline Co. of America in all areas of the Texok zone excluding the portion in Texas and Oklahoma on the NG Line. Applicable to the Texok zone are deliveries to NGPL from the Louisiana-Texas border westward to compressor station 302 in Montgomery County, Tex., and northward to the interconnect with the Gulf Coast Mainline receipt zone in Cass County, Tex. The "Texok Gulf Coast Pooling Point" is included in this posting, but the "Texok A/G Pooling Point" is not. Trades at ICE locations ICE Bennington, Okla. and ICE NGPL, TXOK West Pool are excluded from this location.

It is common for a PRA to require each PR to submit a report of its trades via an electronic mail message. Oftentimes, the report (e.g., a file containing the report) is attached to the electronic mail message. Electronic mail, however, may be considered a form of communication that is not particularly secure. For example, an entity may be able to intercept an electronic mail message sent by another entity and use the trade information of the report to provide a competitive advantage. The entity who intercepts the electronic mail message may also manipulate assessments by modifying the trading information of the report and forwarding the modified report to the PRA. Such malicious intercepting can be detrimental to the overall commodity market. In addition, submitting trading information via an electronic mail message is considered to be "batch" processing of information. With such batch processing, the PR may not receive timely feedback on whether trading information of the report is, for example, in a correct format or contains incorrect/inconsistent information. As a result, a PRA may publish an assessment based on only a subset of the relevant trades.

It would be desirable if a PRA could ensure that trades of one entity are not available to another entity, that trades of an entity are securely received and accurately processed in a timely manner, that assessments include each relevant trade, and that a PR can receive a dynamic report on what assessments are using a transaction it submits.

BRIEF DESCRIPTION OF THE DRAWINGS

FIG. 1 illustrates a display page for uploading a report that contains commodity trades.

FIG. 2 illustrates a display page listing alerts related to uploading of a report.

FIG. 3 illustrates a display page providing the upload history of reports.

FIG. 4 illustrates a display page listing individual trades of a report.

DETAILED DESCRIPTION

Figure 5:
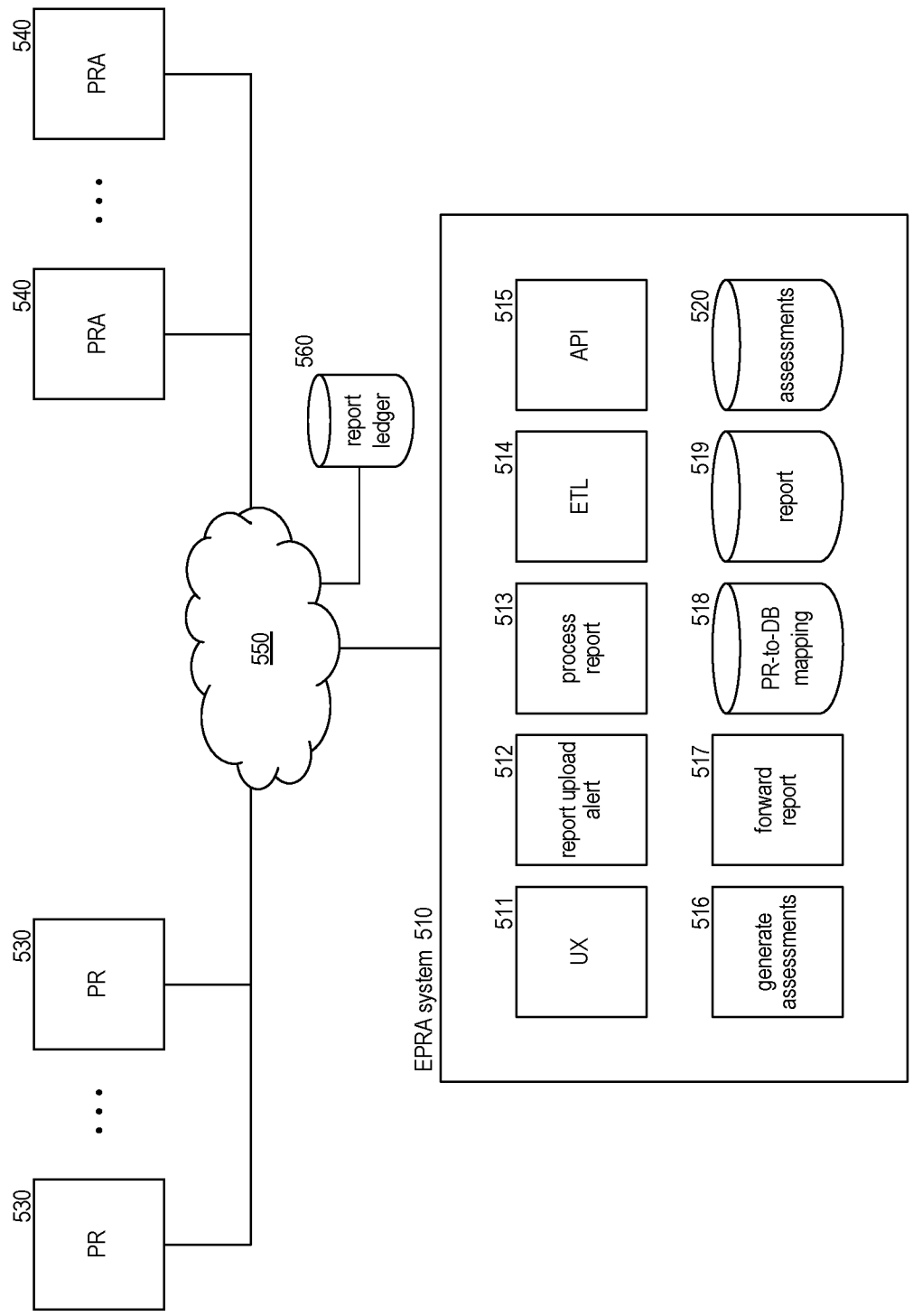
FIG. 5 is a block diagram that illustrates components of the EPRA system in some embodiments.

Methods and systems are provided for securely submitting to a PRA trade information on commodity trades for commodities. In some embodiments, an enhanced price reporting agency ("EPRA") system receives from PRs reports on commodity trades between the PRs and other entities. A report submitted by a PR contains information on commodity trades involving that PR that may include delivery date, location, quantity, and pricing for each commodity trade. For example, for the natural gas commodity, the trade information may include a date range for delivery of a certain quantity (e.g., BTUs) to a certain meter (e.g., to a city) on a certain pipeline for a price per quantity (e.g., dollars per BTU). The EPRA system may provide a user interface through which a PR can upload a report directly to the EPRA system. The report may be encrypted with a public key of a public/private keypair of the EPRA system and may be signed with a private key of a public/private keypair of the PR. Upon receiving the report, the EPRA system may decrypt the report using its private key and verify the signature using the PR's public key. The EPRA system may then generate a hash of the report as evidence of the commodity trades of the report. The EPRA system may generate the hash of the entire report or selected portions of the report. The hash may be generated using various hash techniques such as a Secure Hash Algorithm published by the United States National Institute of Standards (e.g., SHA-256 and SHA-512). The EPRA system then provides the hash to the PR, which can then independently generate the hash and compare the hashes to ensure that the report was accurately received by the EPRA system.

In some embodiments, upon receiving a report, the EPRA system processes each commodity trade by mapping its location to an assessment that includes that location, which means that the commodity trade is included in or relevant to the assessment. For example, an aggregate assessment may be defined that is based on trades at an aggregation of locations such as a group of meters on a pipeline, and an individual assessment may be defined that is based on trades at a single meter. A commodity trade at one of the meters may be included in both the aggregate assessment and the individual assessment for that meter.

In some embodiments, as an initial step when a report is received, the EPRA system may verify whether the report for a PR has any problems. Each PR may provide its report in a PR-specific format. For example, if the report is provided as a spreadsheet, one PR may place pricing information in column B, and another PR may place pricing information in column P. Also, each PR may use a different name to refer to the same location. The EPRA system may maintain a mapping of each PR-specific format to a common format used by the EPRA system. The EPRA system verifies whether the report is in the expected format (e.g., no text in currency columns). The EPRA system may also identify other problems with the trade information such as duplicate trades, unknown locations, outlier prices, and so on. After the report is verified, the EPRA system may employ an extract, transform, and load ("ETL") process to load the commodity trades into a data store (e.g., database). The data store may be a database maintained by the EPRA system, a ledger of a trusted authority, a distributed ledger (e.g., blockchain), and so on. A PR may upload a report directly to the ledger of a trusted authority, which is a third party, and receive the hash from the trusted authority. Whether the hash is generated by the trusted authority or the EPRA system, the hash is stored in the data store.

In some embodiments, the EPRA system provides a user experience that alerts PRs of the status of submissions of reports, including actions that are needed (e.g., correction of a problem), and that provides a listing of their commodity trades. The listing may include date, location, quantity, and pricing information along with the assessments (if any) in which a commodity trade is included. The listing for a report may also include the hash of the report. To be included in assessments (e.g., daily assessments), a PRA publishes a deadline indicating the time by which the report on commodity trades should be uploaded to be included in the assessments. To help ensure that reports are uploaded in a timely manner, the EPRA system may provide alerts (e.g., text messages and pop-up windows) to a PR that has not yet submitted a report. The EPRA system may increase the frequency of the alerts as the deadline approaches. The EPRA system may also provide status information such as submitted, revisions needed, accepted, and so on.

In some embodiments, the EPRA system facilitates the uploading of a report by a PR to other PRAs. The EPRA system of a PRA may provide a display page through which a PR can designate other PRAs to receive reports of the PR. Once a report is uploaded, the EPRA system may simply forward the report (e.g., via electronic mail message) to the designated PRAs. Alternatively, the EPRA system may provide an interface through which another PRA may download the report. For example, the EPRA system may provide a user interface through which another PRA can log in, view available reports, and select reports to download. As another example, the EPRA system may provide an application program interface through which another PRA can download a report (e.g., using the File Transfer Protocol). When another PRA downloads a report of a PR, the EPRA system may report the download to that PR so that that PR can track which PRAs downloaded its reports. If a PRA did not download a report, then the PR would know that its trades were not included in assessments produced by that PRA. The EPRA system may also first ensure that the format of the report is correct (e.g., revised as appropriate) so that the PR does not need to deal with requests from multiple PRAs to correct the report. The EPRA system may also convert the reports in PR-specific formats to a common format before sending to the designated PRAs. In this way, a PR need deal only with the EPRA system and not with each designated PRA when a PR-specific format changes.

In some embodiments, the EPRA system may provide an application programming interface ("API") through which a PR system of a PR can automatically upload reports to the EPRA system. The PR system and the EPRA system may establish a secure connection for uploading the reports. The secure connection may use symmetric (e.g., Diffie-Hellman) and/or asymmetric encryption (e.g., public/private keypairs). The API may provide a web service based on a representational state transfer (i.e., RESTful) architecture to facilitate the uploading of reports. The PR system may automatically upload the report using an upload interface (e.g., remote procedure call) of the API. Upon receiving a report, the EPRA system may decrypt it and, if it is signed by the PR, check its signature. The EPRA system may then send an acknowledgement message to the PR system. After performing a verification process, the EPRA system notifies the PR computing system whether the report has problems and needs revisions. The EPRA system processes the revised report in a similar manner. By providing the API, the EPRA system helps reduce the chances of mistakes (e.g., uploading late or the wrong report) in the uploading of a report. In some embodiments, a PR may upload a report directly to a ledger provided by a trusted authority. The EPRA system may process the report as if it were uploaded using a user interface or an API.

Although described primarily in the context of producing assessments, the EP RA system may be used to produce other pricing indicators such as assessments. When used to produce assessments, a report may include information on bids and offers that did not result in a trade. A report may include both trade and bid/offer information, or separate reports may include trades only and bids/offers only. The EPRA system may process a report that includes bid/offer information in a manner similar to its processing of a report that includes trades. The ETL processing for bids/offers may be different from the processing for trades based on differences in the information included in and format of the respective reports.

FIG. 1 illustrates a display page for uploading a report that contains commodity trades. Display page 100 includes a date field 101 and a report name field 102. To upload a report, a user enters the date associated with the report and the name of the file that contains the report. Alternatively, the date may be extracted from the report. When uploading a report, a user may have various options that may be selected using checkboxes 103. For example, if a user wants to upload the report for use in generating assessments, the user would select the upload checkbox. If a user wants to forward the report to a designated PRA, the user would select the forward checkbox. If a user wants to receive a hash of the report, the user would select the generate hash checkbox. If a user wants verification that the uploaded or forwarded report was in a correct format, then the user would select the verify checkbox. The user may select various combinations of the checkboxes. The user then selects the submit button 104 to have the selected options performed. In some embodiments, a display page may not include checkboxes for the options. In such a case, the EPRA system may automatically perform all the options when the submit button is selected.

FIG. 2 illustrates a display page listing alerts related to uploading of a report. Display page 200 includes alerts 201-206. Alert 201 indicates that a report with the name of 2019-07-01.csv was uploaded on 2019 Jul. 1 at 12:45 ET. Alerts 202-203 indicate that a PR was notified at 12:40 ET and 12:30 ET to upload a report by 13:00 ET. Alert 206 indicates that a report with the name of 2019-06-28.csv was uploaded on 2019 Jun. 28 at 12:50 ET. Alert 205 indicates that a correction request for the report with the name of 2019-06-28.csv was sent on 2019 Jun. 28 at 13:20 ET. Alert 204 indicates that a corrected report with the name of 2019-06-28(C).csv was uploaded on 2019 Jun. 28 at 14:05 ET.

FIG. 3 illustrates a display page providing the upload history of reports. Display page 300 includes lines 301-306 listing reports that have been uploaded. Each line includes the date of the report, number of trades, report name, hash of the report, and status. The status information may include uploaded but not verified, verified, uploaded and corrected, and so on.

FIG. 4 illustrates a display page listing individual trades of a report. In this example, the report is the report uploaded on 2019 Jul. 1. Display page 400 includes lines 401-404 listing the trades of the report. The information for each trade includes a start flow time, end flow time, buy/sell indicator, location, assessments, quantity, and price. Line 401 indicates a start flow time of 2019 Jul. 2 and an end flow time of 2019 Jul. 3. The line indicates that the trade was for a sale by the PR at the location identified as point P2 of line L1 for a quantity of 10 units at a price of $2.14. The location may be displayed using terminology submitted by the PR in the report because different PRs may use their own terminology to identify locations. The line also indicates that the trade was included in assessments 13 and IS.

FIG. 5 is a block diagram that illustrates components of the EPRA system in some embodiments. The EPRA system 510, which is operated by a PRA, is connected to PR systems 530 and the price reporting agency systems 540 via communications channel 550. The systems are also connected to a report ledger 560. The EPRA system includes a user experience component 511, a report upload alert component 512, a process report component 513, an ETL component 514, an API component 515, a generate assessments component 516, and a forward report component 517. The EPRA system also includes a PR-to-DB mapping data store 518, a report data store 519, and an assessment data store 520. The user experience component provides the overall user experience, such as providing display pages 100-400. The report upload alert component generates and sends alerts to PRs relating to the uploading of reports. The process report component processes a report and invokes the ETL component to extract, transform, and load the commodity trades into the report data store and the report ledger. The API component provides an interface for a PR to automatically upload reports without using an upload display page such as that illustrated in FIG. 1. The generate assessments component generates various assessments based on the data of the report data store or the report ledger. The forward report component forwards a report to designated PRAs. The PR-to-DB mapping data store contains a mapping for each PR from the fields of reports submitted by that PR to fields of the report data store. The report data store may contain a report as uploaded from a PR. The assessment data store contains the assessments generated by the generate assessments component. The report ledger may be a database controlled by a trusted authority, a private distributed ledger, a blockchain, and so on.

In some embodiments, the EPRA system and/or a PR system may employ secure enclave technology (e.g., Intel's Secure Guard Extensions) to further ensure security of the reports and related data. With a secure enclave, a PR can ensure that a report is being uploaded to trusted code of an EPRA system that is executing in a secure enclave (e.g., using an attestation process). Similarly, the EPRA system can ensure that a report is being uploaded from trusted code of a PR system.

The computing systems (e.g., nodes) on which the EPRA system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the EPRA system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The EPRA system may be described in the general context of computer-executable instructions, such as program modules and components, executed by one or more computers, processors, or other devices. Generally, program modules or components include routines, programs, objects, data structures, and so on that perform tasks or implement data types of the EPRA system. Typically, the functionality of the program modules may be combined or distributed as desired in various examples. Aspects of the EPRA system may be implemented in hardware using, for example, an application-specific integrated circuit ("ASIC") or field programmable gate array ("FPGA").

Figure 6:
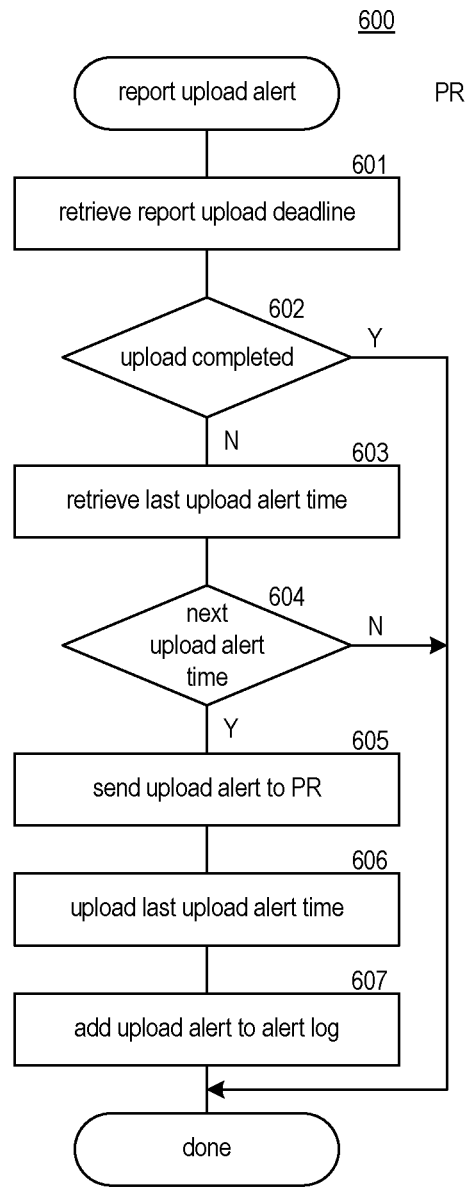
FIG. 6 is a flow diagram that illustrates the processing of a report upload alert component of the EPRA system in some embodiments.

FIG. 6 is a flow diagram that illustrates the processing of a report upload alert component of the EPRA system in some embodiments. A report upload alert component 600 may be invoked periodically to generate alerts for an indicated PR. In block 601, the component retrieves an indication of the next deadline for uploading a report for the PR. Each PR may have the same deadline, or PRs may have different deadlines based on, for example, different types of PRs, different time zones, and so on. In decision block 602, if the report for the deadline has already been uploaded, then the component completes, else the component continues at block 603. In block 603, the component retrieves the last upload alert time sent to the PR. In decision block 604, if it is time for the next upload alert to be sent, then the component continues at block 605, else the component completes. In block 605, the component sends an upload alert to the PR. In block 606, the component updates the last upload alert time. In block 607, the component adds the alert to an alert log that can be displayed to the PR and then completes.

Figure 7:
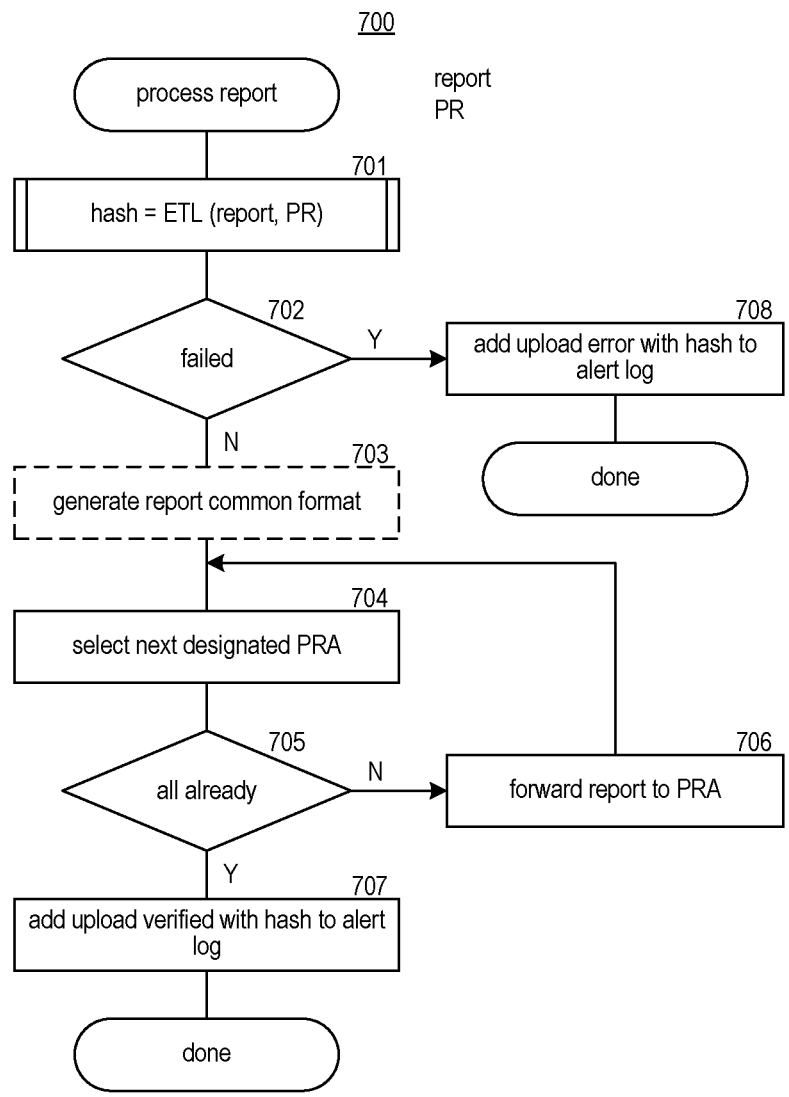
FIG. 7 is a flow diagram that illustrates the processing of a process report component of the EPRA system in some embodiments.

FIG. 7 is a flow diagram that illustrates the processing of a process report component of the EPRA system in some embodiments. A process report component 700 is invoked, passing an indication of a report and the PR that uploaded the report, to process the report. In block 701, the component invokes the ETL component, passing an indication of the report and the PR, to load the report into the report data store and the report ledger and generate a hash. In decision block 702, if the ETL component returns an indication of a failure, then the component continues at block 708, else the component continues at block 703. In block 703, the component may optionally generate a report in a common format. In block 704, the component selects the next designated PRA for the PR. In decision block 705, if all the designated PRAs have already been selected, then the component continues at block 707, else the component continues at block 706. In block 706, the component forwards the report, which may be in the common format, to the selected PRA and then loops to block 704 to select the next designated PRA. In block 707, the component generates an upload verified alert with an indication of the hash of the report into an alert log and then completes. In block 708, the component adds an upload error with the hash of the report to the alert log and then completes. In some embodiments, when a report is uploaded, the EPRA system may generate a hash of the report and store the hash in a data store prior to performing any other processing of the report (e.g., processing by the ETL component).

Figure 8:
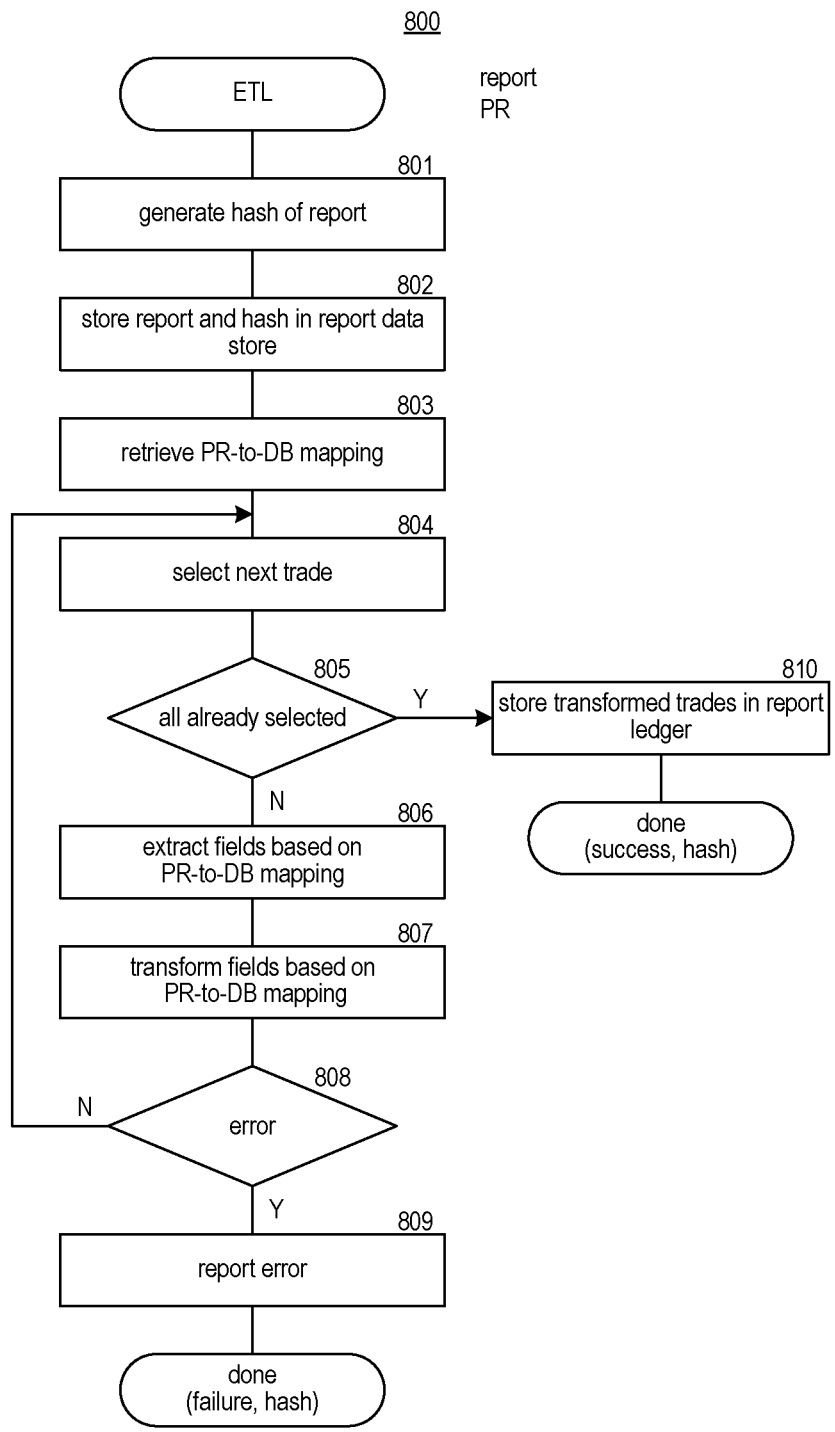
FIG. 8 is a flow diagram that illustrates the processing of an ETL component of the EPRA system in some embodiments.

FIG. 8 is a flow diagram that illustrates the processing of an ETL component of the EPRA system in some embodiments. The ETL component 800 is invoked, passing an indication of a report of a PR that is to be stored in the report ledger. In block 801, the component generates a hash of the report. In block 802, the component stores the report and the hash in the report data store. In block 803, the component retrieves the PR-to-DB mapping for the PR. In block 804, the component selects the next trade of the report. In decision block 805, if all the trades have already been selected, then the component continues at block 810, else the component continues at block 806. In block 806, the component extracts fields from the report based on the PR-to-DB mapping. In block 807, the component transforms the fields as needed based on the PR-to-DB mapping. For example, it may transform PR-specific location identifiers to identifiers of the EPRA system. The component also verifies the correctness of the trades. In decision block 808, if an error was encountered in the extraction or transformation, then the component continues at block 809, else the component loops to block 804 to select the next trade. In block 809, the component completes, reporting a failure along with a hash of the report. In block 810, the component stores the transformed trades into the report ledger and then completes, indicating success along with the hash of the report file.

Figure 9:
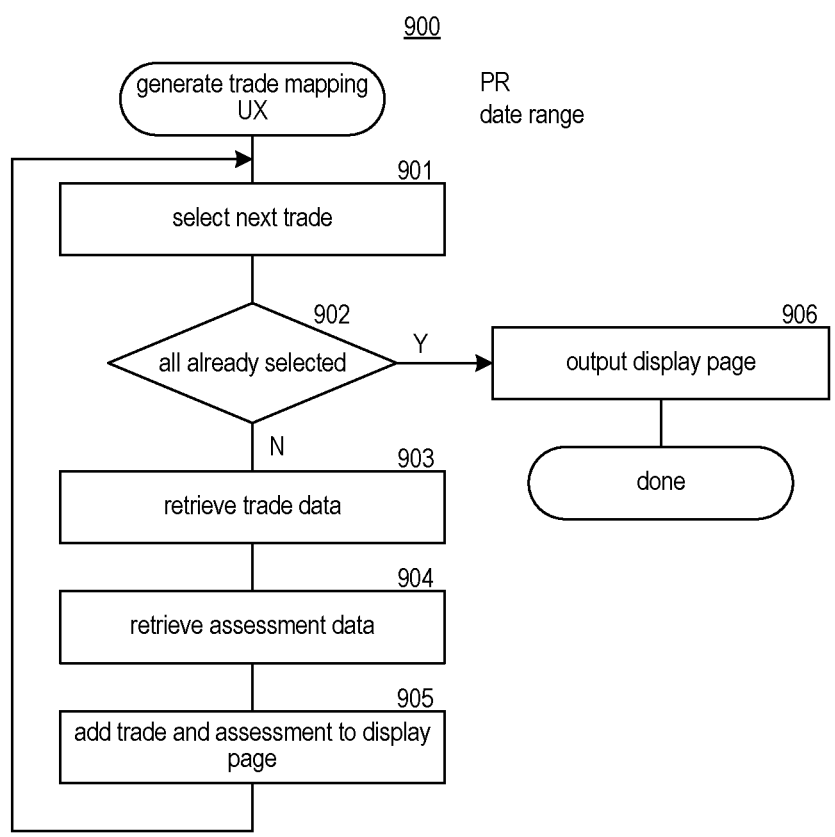
FIG. 9 is a flow diagram that illustrates processing of a generate trade mapping user experience component in some embodiments.

FIG. 9 is a flow diagram that illustrates processing of a generate trade mapping user experience component in some embodiments. The generate trade mapping user experience component 900 is invoked, passing an indication of a PR and a date range for providing the mapping of trades of the PR to assessments that include those trades. The component may also be provided various other filters specifying, for example, to list only buy or sell trades, only trades at certain locations, and so on. In block 901, the component selects the next trade for the PR that matches the filters. In decision block 902, if all the trades have already been selected, then the component continues at block 906, else component continues at block 903. In block 903, the component retrieves the trade data for the selected trade. In block 904, the component retrieves the assessment data indicating the assessments in which the trade was included. In block 905, the component adds the trade data and the assessment data to a display page and then loops to block 901 to select the next trade. In block 906, the component outputs the display page and then completes.

Blockchain Implementation

In some embodiments, the reports and assessments may be stored in a ledger that is a blockchain. In such embodiments, various components of the EPRA system may be implemented using smart contracts. For example, to upload a report, a PR may store the report in the blockchain and send a message to the smart contract to process the report.

To ensure security, the report may be encrypted using a public key of the PRA and signed with a private key of the PR. The smart contract performs the ETL processing as described above. The ETL process may store each transformed trade in the blockchain as a transaction. The information of the trades may be encrypted so that only the PR and the PRA have access to the trades. The information may also be encrypted so that designated PRAs may have access to the trades without PRs having to separately forward reports to designated PRAs. The alert features of the EPRA system may also be implemented using smart contracts. A smart contract that executes periodically (e.g., based on a timing message sent from an oracle) may generate and record alerts in the blockchain. The alerts may also be sent to an external system for forwarding to a PR. A regulatory authority may also be granted access to all the trade information to ensure compliance with the guidelines such as ensuring that an assessment is generated using all relevant trades.

In the following, an overview of distributed ledgers including blockchains is provided. The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key (or a hash of the public key, referred to as an "address") of the new owner, is digitally signed by the owner with the owner's private key to transfer ownership to the new owner, as represented by the new owner public key. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions fora bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

The bitcoin system is an example of a blockchain-based distributed ledger system. Other blockchain-based distributed ledger systems include Ethereum, Litecoin, Ripple, IOTA, and so on, which each support a type of cryptocurrency. To enable more complex transactions than the bitcoin system can support, some distributed ledger systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide on which transactions to keep and which transactions to discard.

"Wallet" software has been developed to help users of the bitcoin system to generate and store their public and private key pairs, submit transactions to be recorded in the blockchain, and track their account balances by their addresses, each address being, as described above, a hash of a public key of a public and private key pair of a user. For example, wallet software may list for each address the amount of unspent bitcoin associated with that address. Because a user's private key is needed when the user spends bitcoin that the user owns, users need to ensure that their private key is neither stolen nor lost. If their private key were stolen, then the thief could transfer the bitcoin assigned to the address of the corresponding public key to the thief's own address—meaning that the thief now owns the bitcoin. If a user's private key is lost, then the user could not spend the bitcoin assigned to the address of the corresponding public key—meaning that the user has effectively lost the bitcoin. Wallet software can provide mechanisms to help ensure that the private keys are neither stolen or lost.

The following paragraphs describe various embodiments of aspects of the EPRA system. An implementation of the EPRA system may employ any combination of the embodiments. The processing described below may be performed by a computing device with a processor that executes computer-executable instructions stored on a computer-readable storage medium that implements the EPRA system.

In some embodiments, a method performed by one or more computing systems for securely tracking submissions of commodity trades for commodities is provided. The method receives from a price reporter a report on commodity trades between the price reporter and another entity. Each commodity trade includes pricing information and a location of delivery of a commodity. The method generates a hash of the report as evidence of the commodity trades of the report. For each commodity trade of the report, the method identifies an assessment of pricing information that is to include that commodity trade by mapping the location of that commodity trade to the assessment. The method provides to the price reporter the hash of the report as evidence of the commodity trades of the report. The method provides to the price reporter a listing of the commodity trades of the report, the listing identifying, for each commodity trade. Each assessment that includes that commodity trade. In some embodiments, the report is received via uploading from the price reporter a file that contains the report. In some embodiments, the method further comprises sending an alert to the price reporter in advance of a deadline when the report has not yet been uploaded. In some embodiments, multiple alerts are sent with increasing frequency as the deadline approaches. In some embodiments, the method further comprises sending to the price reporter status information relating to processing of the report. In some embodiments, the status information indicates whether the report needs revision. In some embodiments, the method further comprises receiving from the price reporter a revised report. In some embodiments, the commodity is natural gas and a commodity trade includes multiple locations. In some embodiments, the commodity is natural gas and a commodity trade identifies start time and end time of delivery of and quantity of the natural gas to be delivered. In some embodiments, the report is received from a computer system of the price reporter via an application programming interface for uploading reports. In some embodiments, the application programming interface provides public/private key encryption for securely uploading reports. In some embodiments, the method further comprises sending the report to a designated price reporting agency. In some embodiments, the method further comprises generating a common report with a common format wherein the sending of the report to the designated price reporting agency sends the common report.

In some embodiments, one or more computing systems of a price reporting agency for securely tracking submissions of commodity trades for commodities are provided. The one or more computing systems comprise one or more computer-readable storage mediums for storing computer-executable instructions for controlling the one or more computing systems and one or more processors for executing the computer-executable instructions stored in the one or more computer-readable storage mediums. The instructions control the one or more computing system to, for each of a plurality of price reporters, establish a secure connection between a computing system of the price reporting agency and a computer system of the price reporter for transmitting encrypted data. The instructions control the one or more computing system to receive from the price reporter, via the secure connection and an application programming interface of the computer system of the price reporter, a report on commodity trades by the price reporter. Each commodity trade including pricing information and a location of delivery of a commodity. The instructions control the one or more computing system to generate a hash of the report as evidence of the commodity trades of the report. The instructions control the one or more computing system to for each commodity trade of the report, map the location of that commodity trade to an assessment of pricing information wherein that commodity trade is included in the assessment. The instructions control the one or more computing system to provide via the secure connection to the price reporter a user interface that includes a listing of the commodity trades of the report and the hash of the report as evidence of the commodity trades of the report, the listing identifying, for each commodity trade, each assessment that includes that commodity trade, location of delivery, and pricing information. In some embodiments, the secure connection is established with a secure enclave of the computing system of the price reporter wherein the computer system of the price reporter verifies code executed by the secure enclave. In some embodiments, the instructions further control the one or more computing systems to store the report and the hash on a ledger so that the price reporter can verify the report received by the price reporting agency. In some embodiments, the ledger is maintained by a trusted authority. In some embodiments, the ledger is a distributed ledger. In some embodiments, the ledger is a blockchain. In some embodiments, the instructions further control the one or more computing systems to store the report in a database of a third party and receive from the third party the hash of the report wherein the price reporter can verify the report using the hash. In some embodiments, the third party provides the hash directly to the price reporter. In some embodiments, the commodity is natural gas. In some embodiments, a commodity trade is associated with multiple locations and the user interface identifies the multiple locations. In some embodiments, a commodity trade is included in multiple assessments and the user interface identifies the multiple assessments.

In some embodiments, a method performed by one or more computing systems for securely tracking submissions of commodity information is provided. The method receives receiving from a price reporter a report containing commodity information relating to commodity transactions involving the price reporter. The commodity information includes pricing information and a location associated with the commodity transaction. The method generates a hash of the report as evidence of the commodity transactions of the report. The method, for each commodity transaction of the report, identifies a pricing indicator that is to include that commodity transaction based on a mapping of the location of that commodity transaction to the pricing indicator. The method provides to the price reporter the hash of the report as evidence of the commodity transactions of the report. The method provides to the price reporter a listing of the commodity transactions of the report. The listing identifies, for each commodity transaction, each pricing indicator that includes that commodity transaction. In some embodiments, the report is received via uploading from the price reporter a file that contains the report. In some embodiments, the method further comprises sending to the price reporter status information relating to processing of the report. In some embodiments, the report is received from a computer system of the price reporter via an application programming interface for uploading reports. In some embodiments, the commodity transactions include trades. In some embodiments, the commodity transactions include bids and offers.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by one or more computing systems for securely tracking submissions of commodity trades for commodities, the method comprising:
    establishing a secure connection between a computing system of a price reporting agency and a computing system of a price reporter for transmitting encrypted data
    receiving from the price reporter, via the secure connection and an application programming interface of the computing system of the price reporter, a report on commodity trades between the price reporter and another entity, each commodity trade including pricing information and a location of delivery of a commodity;
    generating a hash of the report as evidence of the commodity trades of the report;
    for each commodity trade of the report, identifying an assessment of pricing information that is to include that commodity trade by mapping the location of that commodity trade to the assessment;
    providing, via the secure connection, to the price reporter the hash of the report as evidence of the commodity trades of the report;
    providing, via the secure connection, to the price reporter a listing of the commodity trades of the report, the listing identifying, for each commodity trade, each assessment that includes that commodity trade, location of delivery, and pricing information;
    generating a common report with a common format based on at least one mapping between a price reporter-specific format and the common format; and
    sending the common report to a designated price reporting agency.

2. The method of claim 1 wherein the report is received via uploading from the price reporter a file that contains the report.

3. The method of claim 2, further comprising sending an alert to the price reporter in advance of a deadline when the report has not yet been uploaded.

4. The method of claim 3 wherein multiple alerts are sent with increasing frequency as the deadline approaches.

5. The method of claim 1, further comprising sending to the price reporter status information relating to processing of the report.

6. The method of claim 5 wherein the status information indicates whether the report needs revision.

7. The method of claim 6, further comprising receiving from the price reporter a revised report.

8. The method of claim 1 wherein the commodity is natural gas and a commodity trade includes multiple locations.

9. The method of claim 1 wherein the commodity is natural gas and a commodity trade identifies start time and end time of delivery of and quantity of the natural gas to be delivered.

10. The method of claim 1 wherein the report is received from the computing system of the price reporter via an application programming interface for uploading reports.

11. The method of claim 10 wherein the application programming interface for uploading reports provides public/private key encryption for securely uploading reports.

12. One or more computing systems of a price reporting agency for securely tracking submissions of commodity trades for commodities, the one or more computing systems comprising:
    one or more non-transitory computer-readable storage mediums storing computer-executable instructions that, when executed by one or more processors of the one or more computing systems, cause the one or more computing systems to, for each of a plurality of price reporters:
        establish a secure connection between a computing system of the price reporting agency and a computer system of the price reporter for transmitting encrypted data;
        receive from the price reporter, via the secure connection and an application programming interface of the computer system of the price reporter, a report on commodity trades by the price reporter, each commodity trade including pricing information and a location of delivery of a commodity;
        generate a hash of the report as evidence of the commodity trades of the report;
        for each commodity trade of the report, map the location of that commodity trade to an assessment of pricing information wherein that commodity trade is included in the assessment;
        provide via the secure connection to the price reporter a user interface that includes a listing of the commodity trades of the report and the hash of the report as evidence of the commodity trades of the report, the listing identifying, for each commodity trade, each assessment that includes that commodity trade, location of delivery, and pricing information;
        generate a common report with a common format based on at least one mapping between a price reporter-specific format and the common format; and
        send the common report to a designated price reporting agency.

13. The one or more computing systems of claim 12 wherein the secure connection is established with a secure enclave of the computing system of the price reporter wherein the computer system of the price reporter verifies code executed by the secure enclave.

14. The one or more computing systems of claim 12 wherein the one or more non-transitory computer-readable storage mediums further store computer-executable instructions that, when executed by the one or more processors of the one or more computing systems, further cause the one or more computing systems to store the report and the hash on a ledger so that the price reporter can verify the report received by the price reporting agency.

15. The one or more computing systems of claim 14 wherein the ledger is maintained by a trusted authority.

16. The one or more computing systems of claim 14 wherein the ledger is a distributed ledger.

17. The one or more computing systems of claim 14 wherein the ledger is a blockchain.

18. The one or more computing systems of claim 12 wherein the one or more non-transitory computer-readable storage mediums further store computer-executable instructions that, when executed by the one or more processors of the one or more computing systems, further cause the one or more computing systems to store the report in a database of a third party and receive from the third party the hash of the report wherein the price reporter can verify the report using the hash.

19. The one or more computing systems of claim 18 wherein the third party provides the hash directly to the price reporter.

20. The one or more computing systems of claim 12 wherein the commodity is natural gas.

21. The one or more computing systems of claim 20 wherein a commodity trade is associated with multiple locations and the user interface identifies the multiple locations.

22. The one or more computing systems of claim 20 wherein a commodity trade is included in multiple assessments and the user interface identifies the multiple assessments.

23. A method performed by one or more computing systems for securely tracking submissions of commodity information, the method comprising:

establishing a secure connection between a computing system of a price reporting agency and a computer system of a price reporter for transmitting encrypted data;

receiving from the price reporter, via the secure connection and an application programming interface of the computer system of the price reporter, a report containing commodity information relating to commodity transactions involving the price reporter, the commodity information including pricing information and a location associated with the commodity transaction;

generating a hash of the report as evidence of the commodity transactions of the report;

for each commodity transaction of the report, identifying a pricing indicator that is to include that commodity transaction based on a mapping of the location of that commodity transaction to the pricing indicator;

providing, via the secure connection, to the price reporter the hash of the report as evidence of the commodity transactions of the report;

providing, via the secure connection, to the price reporter a listing of the commodity transactions of the report, the listing identifying, for each commodity transaction, each pricing indicator that includes that commodity transaction, location of delivery, and pricing information;

generating a common report with a common format based on at least one mapping between a price reporter-specific format and the common format; and sending the common report to a designated price reporting agency.

24. The method of claim 23 wherein the report is received via uploading from the price reporter a file that contains the report.

25. The method of claim 23, further comprising sending to the price reporter status information relating to processing of the report.

26. The method of claim 23 wherein the report is received from a computer system of the price reporter via an application programming interface for uploading reports.

27. The method of claim 23 wherein the commodity transactions include trades.

28. The method of claim 23 wherein the commodity transactions include bids and offers.

* * * * *